June 18, 1929.  C. H. JOHNSON  1,717,882

CORN PICKER

Filed March 22, 1926  2 Sheets-Sheet 1

INVENTOR:
Chester H. Johnson
BY David E. Carlsen
ATTORNEY.

INVENTOR:
Chester H. Johnson
BY David E. Carlsen
ATTORNEY.

Patented June 18, 1929.

1,717,882

UNITED STATES PATENT OFFICE.

CHESTER H. JOHNSON, OF CRESBARD, SOUTH DAKOTA.

CORN PICKER.

Application filed March 22, 1926. Serial No. 96,519.

My invention relates to corn pickers and the object is to provide a simple and efficient wheeled implement which is moved along the rows of corn and picks the ears of corn, leaving the stalks standing. Under certain conditions my machine husks or partly husks the ears of corn which after being separated from the stalks are carried by an inclined elevator or conveyor into the box of any suitable wagon drawn behind the device.

Figure 1:
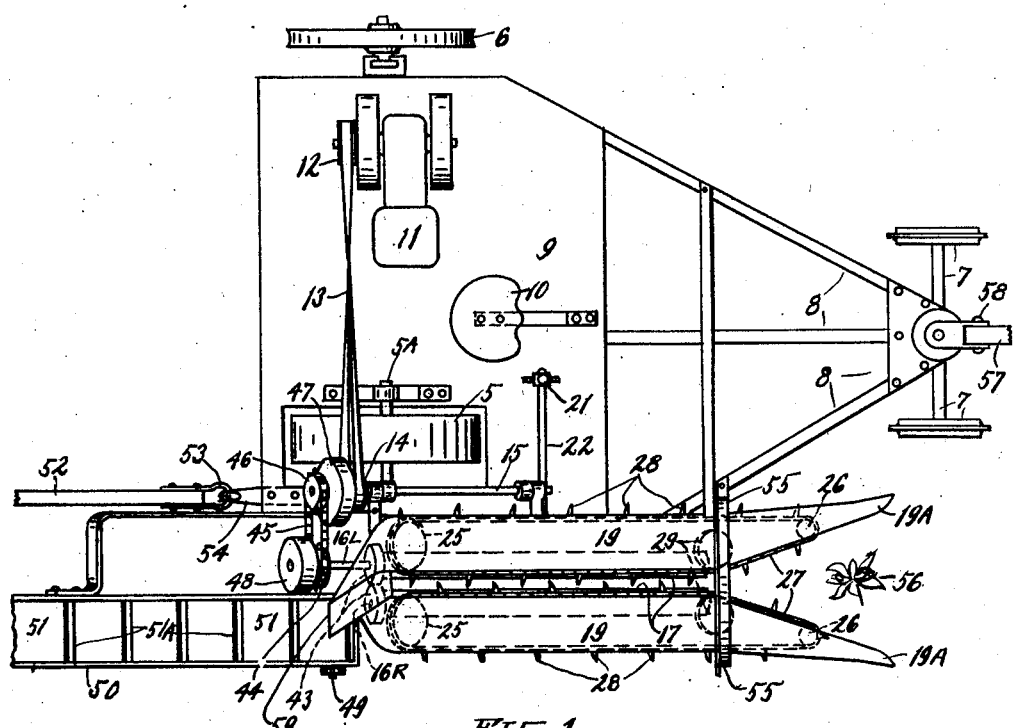
Fig. 1 is a top view of my device and showing only a portion of the endless belt conveyor.

Referring to the drawing by reference numerals 5 designates the bull wheel, 6 the left side wheel, 7 the front truck, 8 the main frame and 9 is the platform on the frame. 10 is the operator's seat mounted on the platform near the bull wheel. 11 is a suitable motor mounted on the left side of the platform. The latter is preferably a gasoline engine having a drive pulley 12 connected by a belt 13 to a driven pulley 14 on a shaft 15 mounted in parallel relation to two shafts 16 of snapping rolls 17, all said three shafts rotatably mounted in the frame of a two part corn gathering and guiding device resembling those commonly known as the corn gatherers and elevators of corn binders. This entire frame will hereinafter be designated the picker frame and may consist of an L-shaped skeleton frame with vertical bars 18, horizontal bars 18A, the free ends of said bars connected by elongated bars 18B. The latter bars (18B) are spaced apart horizontally (see Fig. 3) and support a downwardly and forwardly sloping trough like construction consisting of two guide boards 19 the lower and inner adjacent edges of which are spaced apart and their front extremities formed into spreading and tapering points 19A. The picker frame may be mounted in any suitable manner and be adjustable vertically (not shown) or it may be simply tiltable vertically as on a fulcrum pin 20 (Figs. 2 and 3) and its points 19A raised or lowered by any suitable means such as a hand lever 21 near the driver's seat having a rock shaft 22 with a lever 23 connected to the picker frame by a link 24 (see Fig. 2).

The picker frame points 19A function in the same manner as the points of a corn binder to provide guiding contact with the corn stalks as the machine is drawn forward. The picker frame passes over the corn stalks the latter being guided in the elongated throat or open passage between the boards 19. 25 are a pair of upper sprockets and 26 a lower pair of sprockets one of the former and one of the latter rotatably mounted respectively in the upper and in the lower part of the picker frame under each one of the boards 19. 27 is an endless chain passing over each of the upper sprockets and its corresponding lower sprocket the inwardly exposed and adjacent bights of said chains each passing upwardly from its lower sprocket 26 and engaging an idler 29 and from these idlers the chains run parallel upwardly to their upper sprockets 25. 28 are wings on said chains projecting outwardly and alternately into the space between the lower edges of the boards 19 for a purpose presently to be described.

The sprockets 25 are rotated by any suitable driving means such as suitable connection with the engine 11 (not shown) but I have shown driving means operated by the movement of the bull wheel 5. These means constitute a bevel gear 30 keyed on the bull wheel shaft 5A and meshing with a pinion 31 (Fig. 3) on an upright shaft 32 with a universal joint 33, in horizontal alinement with the pivot 20 of the picker frame, and above said joint is a pulley 34 and a sprocket 35 the latter driving a chain 36 engaging also a sprocket 38 on the lower end of the shaft 25×× of a sprocket 25, left side. The said pulley 34 drives a crossed belt 39 engaging another driven pulley 40 on the lower end of the shaft 25× of the right hand sprocket 25 (see Fig. 3). Thus the adjacent parallel bights or runs of both gathering chains are moved upwardly simultaneously at a rate of speed preferably corresponding to the forward rate of speed of the machine and the corn stalks passing between them are therefore retained in upright position. Other mechanical equivalents of this mechanism may also be used.

Figure 2:
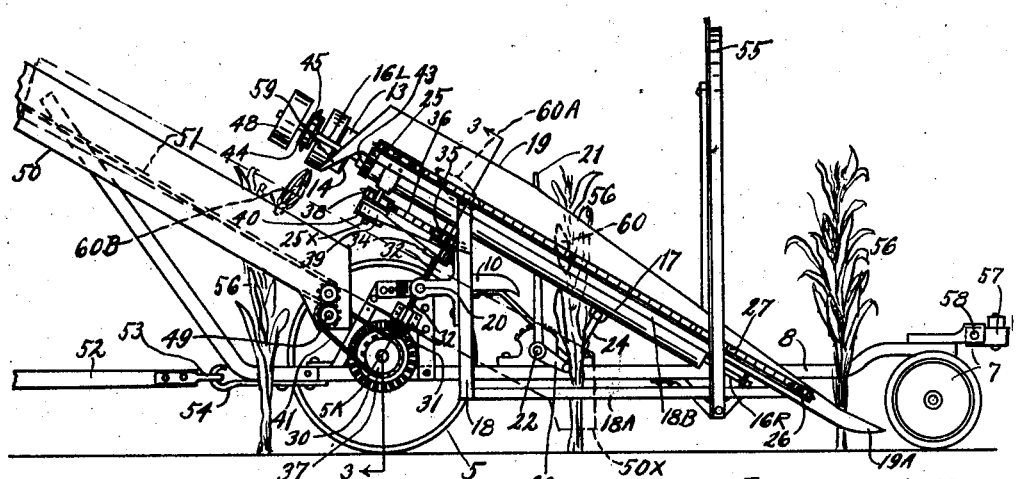
Fig. 2 is a right side elevation of the device.

In Figs. 1 and 2 the right and left hand snapping rolls shafts are designated 16R and 16L respectively. These shafts are journaled in parallel relation to each other and each carries one of the rolls 17 just below each of the parallel and adjacent bights of the chains 27. The rolls are rotated in opposite directions by a pair of meshing gears 43 mounted on the roll shafts adjacent the upper ends of said rolls (see Figs. 1 and 3). One of the shafts as 16L is extended upwardly and carries a driven sprocket 44 rotated by a chain 45 driven by a sprocket 46 fixed on the upper end of drive shaft 15. 47 is a fly-wheel on shaft 15 and 48 is also a fly-wheel keyed on shaft 16L both of said fly-wheels acting as balancers or equilizers and providing a steady and powerful rotation of the roll shaft 16L and the latter in turn provides a powerful but smooth rotation to the snapping rolls.

Figure 3:
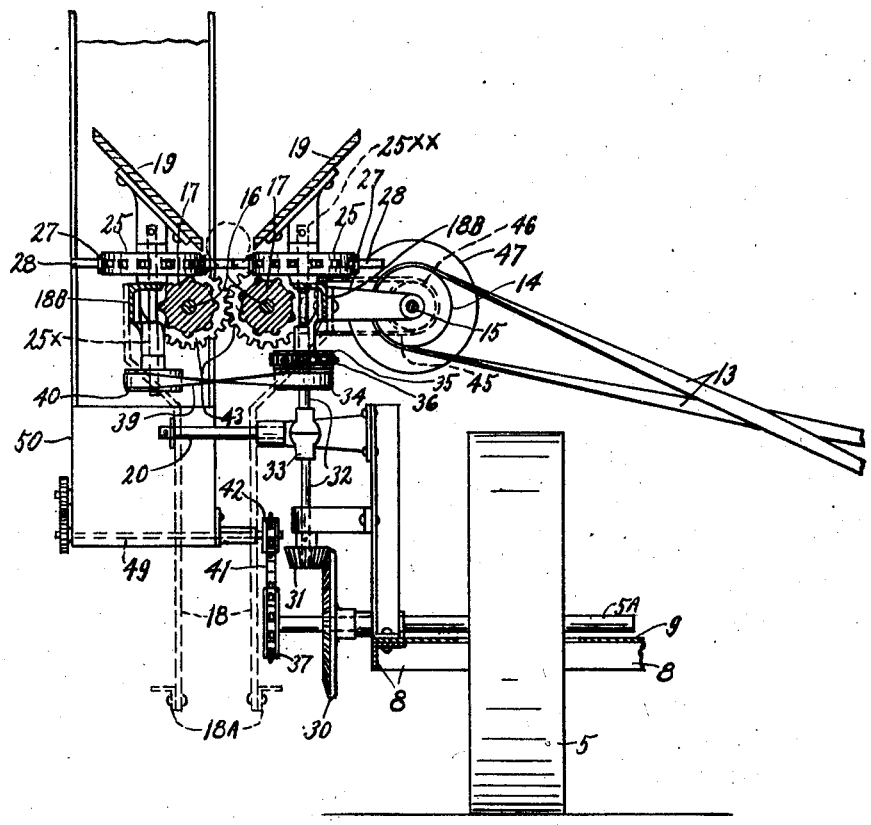
Fig. 3 is an enlarged section approximately as on the line 3—3 in Fig. 2.

In Figs. 2 and 3, 37 is a chain sprocket on the right hand end of the bull wheel shaft 5A, 41 is a chain driven by said sprocket and in turn driving a sprocket 42 on a shaft 49 driving a conveyor belt 51. The upper run of said belt moves rearwardly in an inclined conveyor frame 50 of a predetermined length and adapted to carry ears of corn, dropped rearwardly from the picker frame, to a point where they are dropped into the box of a wagon or other trailer (not shown) which is towed behind the picker device. Cleats 51A in said conveyor belt facilitate the movement of the ears of corn in the conveyor. 52 represents the forward end of the tongue of the trailing vehicle and detachably connected as at 53 to a suitable draw-bar 54 fixed on the rear part of the main frame 8, as best shown in Figs. 1 and 2.

55 in Figs. 1 and 2 is an upright arch suitably fixed to the main frame and straddling the lower part of the picker frame and serving as a vertical guide for said picker frame as well as to gather, to some extent, the parts of the corn stalks which may be spread out considerably previous to movement of the corn picker past and over said stalks. 56 are corn stalks.

57 represents any suitable type of draw bar pivoted at 58 to the truck 7. I have found that three horses will easily pull my device but it is of course readily understood that a tractor may also be used.

The corn picker frame should be mounted with its upper end at a height greater than the normal height of corn and from said upper end any suitable rearwardly and downwardly directed spout-like guard 59 directed to drop the ears of corn into the belt conveyor.

In the use of my device, it is simply drawn forward parallel to a row of corn so that the picker frame passes over the stalks one by one. As the machine proceeds the stalks may be considered as passing rearwardly between the snapping rolls, the latter engaging the corn stalks and snapping off the ears from the stalks at whatever elevation they may be on the stalk. As the ears are snapped off the chain arms moving rearwardly and just above the snapping rolls engage the ears and carry them upward to be dumped into the belt conveyor.

As previously mentioned the gathering chains 27 should move rearwardly at about the same rate of speed as the picker moves forward the purpose of this being partly to retain the corn stalks in normal upright position as the snapping rolls take off the ears.

In Fig. 2, 60 is an ear of corn being snapped off by the snapping rolls. 60A is an ear that has been separated from the stalk and is being moved upwardly and rearwardly by the chain arms 28, and 60B is an ear of corn dropping from the picker frame into the lower and forward part of the conveyor.

I have found that the ears of corn, while moving rearwardly in the picker frame, and resting more or less on and between the rolls 17 are partly and sometimes nearly completely husked by the action of the snapping rolls. The extent of this husking action is of course largely dependent on the condition of the corn at the time it is being picked, but this husking is of course only incidental in the operation of my corn picker and such action of the snapping rolls is well known in the use of corn husking machines. The main object of my improved corn picker is simply to take the ears of corn off of the standing stalks. The stalks remaining standing after having been stripped of the ears may be subsequently plowed under or otherwise disposed of in any suitable manner.

I have shown the picker frame as pivotally mounted to the right of the bull wheel and on the left side of the main frame a ground wheel 6. This may be termed a right hand machine but it is obvious that the parts may be in reverse relation from that shown for what may be called a left hand machine. Other mechanical means may be employed for driving the gathering chains or for raising, lowering or tilting the picker frame. The rolls 17 must be long enough to snap off ears growing close to the ground or at any height they may be on the stalks.

Figure 4:
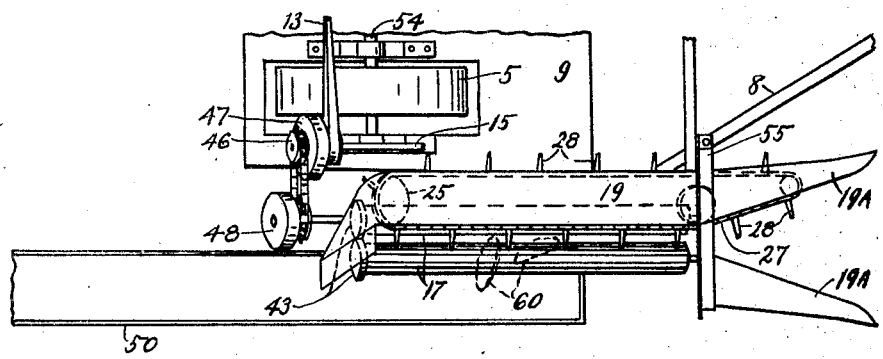
Fig. 4 is a modification of the lower part of Fig. 2.

In Fig. 4 I have shown a modification in construction of my device and which may be considered a preferred construction. Instead of having a pair of gathering chains 27 only one is used on the left or inner side of the picker frame and has extra long fingers 28. Rearwardly of the gathering points 19A there is no right hand guard 19, so the right hand snap roll 17 is exposed. Thus the ears of corn 60, after being removed from the stalks are guided by the fingers 28 and turned as indicated in dotted lines so they will fall outwardly and downwardly from the right hand roller 17. As this dropping of the ears may occur at any height I extend the conveyor frame 50 forward far enough under the picker frame to insure catching of the ears dropped even from the lowest parts of the corn stalks. The longer conveyor frame is shown dotted in Fig. 2 and full in Fig. 4. It is obvious that this form of mv device requires less working parts as there is no right hand chain 27 to be driven.

What I claim is:

In a corn picker of the class described a main frame having a front truck, a bull wheel and rear supporting wheel, a secondary frame comprising an elongated corn picker frame mounted at one side of the main frame and normally in forwardly and downwardly inclined position and having a central elongated opening, a pair of longitudinally corrugated snapping rolls rotatably mounted in said picker frame in parallel relation one on each side of said opening, means for rotating said rolls, said main frame having a draw bar for pulling it in parallel relation to rows of corn stalks with the picker frame straddling one row at a time and passing the stalks successively with its central elongated opening, said snapping rolls adapted to engage the stalks and snap off the ears of corn, a single belt chain element with spaced fingers adapted to move upwardly and rearwardly, above and parallel to adjacent sides of said rolls to engage the ears of corn snapped off by the rollers, a belt conveyor arranged with its forward end under said picker frame and extending rearwardly and upwardly to convey the ears of corn dropped from the picker frame rearwardly, said means for rotating the snapping rolls consisting of a source of power on the main frame, a rotatable shaft mounted on the picker frame in parallel relation to the snapping rolls, a pulley on said shaft, a belt connecting said pulley with the source of power, each said rolls having a shaft and a pinion meshing with the pinion of the other roll shaft, and operative connecting means between said pulley shaft and one of said roller shafts, and a fly-wheel mounted on said pulley shaft, and a fly-wheel on the upper end of one of said snapping roll shafts for the purpose set forth.

In testimony whereof I affix my signature.

CHESTER H. JOHNSON.